United States Patent [19]

Kuze et al.

[11] Patent Number: 5,007,472

[45] Date of Patent: Apr. 16, 1991

[54] PNEUMATIC RADIAL TIRE WITH IMPROVED BEAD STRUCTURE

[75] Inventors: Tetsuya Kuze; Takashi Yamashita; Toshihiko Suzuki, all of Hiratsuka, Japan

[73] Assignee: The Yokohama Rubber Co., Ltd., Tokyo, Japan

[21] Appl. No.: 514,641

[22] Filed: Apr. 25, 1990

[30] Foreign Application Priority Data

Apr. 26, 1989 [JP] Japan .................................. 1-104533

[51] Int. Cl.$^5$ ...................... B60C 15/06; B60C 13/00; B60C 15/00
[52] U.S. Cl. ..................................... 152/546; 152/539; 152/541; 152/543; 152/555; 152/553
[58] Field of Search ............... 152/555, 546, 539, 541, 152/543, 454, 553

[56] References Cited

U.S. PATENT DOCUMENTS

| | | | |
|---|---|---|---|
| 1,243,576 | 10/1917 | Archer | 152/555 X |
| 3,052,275 | 9/1962 | Hylbert, Jr. | 152/546 X |
| 3,853,163 | 12/1974 | Mezzanotte et al. | 152/555 X |
| 3,895,666 | 7/1975 | Inoue | 152/555 X |
| 3,904,463 | 9/1975 | Boileau | 152/555 X |
| 4,716,950 | 1/1988 | Morikawa et al. | 152/543 X |
| 4,726,408 | 2/1988 | Alie et al. | 152/541 |
| 4,762,158 | 8/1988 | Furuya et al. | 152/555 X |
| 4,773,463 | 9/1988 | Okuni et al. | 152/555 X |
| 4,779,659 | 10/1988 | Hanada et al. | 152/555 X |

Primary Examiner—Michael W. Ball
Assistant Examiner—Adrienne C. Johnstone
Attorney, Agent, or Firm—Armstrong, Nikaido, Marmelstein, Kubovcik and Murray

[57] ABSTRACT

A pneumatic radial tire characterized in that:
an inner carcass layer is turned up around each bead core from inside to outside in such a manner as to wrap a bead filler therein;
a steel cord reinforcing layer is disposed outside the inner carcass layer;
an outer carcass layer is disposed in such a manner that it covers the outside of the steel cord reinforcing layer and its end portion extends to at least near the bead core;
a second filler is disposed outside the outer carcass layer;
the second filler has a hardness below that of the bead filler and within the range of 70 to 93 in terms of JIS hardness;
the cord angle of the steel cord reinforcing layer is from 15° to 30° to a tire circumferential direction; and
the height B of the steel cord reinforcing layer from a bead base to its upper end is specified by the following formula, where; the height of the bead filler from the bead base to its upper end is A the height of the second filler from the bead base to its upper end C and a tire sectional height D:

0.2 D < B < 0.5 D   (1)

C > B > A   (2)

4 Claims, 3 Drawing Sheets

PNEUMATIC RADIAL TIRE WITH IMPROVED BEAD STRUCTURE

BACKGROUND OF THE INVENTION

This invention relates to a pneumatic radial tire (hereinafter referred to as a "radial tire") having a two-ply structure consisting of inner and outer carcass layers, and more particularly to a radial tire which improves simultaneously both maneuvering stability and comfort to drive.

A radial tire has been proposed in the past which disposes a steel cord reinforcing layer in a region extending from each bead to each sidewall to improve maneuvering stability of the radial tire, and thus improves rigidity in this region.

For example, Japanese patent application Kokai publication No. 57-18503 proposes a radial tire having a structure wherein a bead filler having a dynamic modulus of elasticity of at least 300 kg/cm$^2$ is disposed in a region extending from the upper surface of each bead core to a sidewall, a steel cord reinforcing layer having a height, from a bead base, within the range of 50% to 75% of a sectional height of the tire is disposed outside the bead filler, a carcass layer is turned up from inside to outside of the bead core in such a manner as to wrap therein these bead filler and steel cord reinforcing layer and the cord angle of this reinforcing layer is from 45° to 75° with respect to the carcass cord, or in other words from 15° to 45° with respect to a tire circumferential direction.

However, the radial tire described above is not free from the following problems. Since rigidity of the side portion of this radial tire increases in all the longitudinal, transverse and circumferential directions of the tire, comfort of drive drops with the increase of rigidity of the side portion in the longitudinal direction, though maneuvering stability can be improved. In the case of tires having a low aspect ratio such as recent radial tires, impact is absorbed at the upper end of the sidewall because the profile of the tire increases rigidity of the belt portion. Therefore, this structure lacks sufficient impact absorption capacity, comfort of drive gets worse and worse durability of the tire drops.

On the other hand, Japanese patent application Kokai publication No. 49-43304 discloses a radial tire having a structure wherein a steel cord reinforcing layer whose cord angle is from 5° to 15° with respect to the tire circumferential direction is disposed in the region of 25% to 45% of the sectional height of the tire, in order to satisfy both maneuvering stability and comfort of drive. This radial tire reduces rigidity of the side portion in the longitudinal direction by reducing markedly the cord angle of the steel cord reinforcing layer to the tire circumferential direction and improves comfort of drive. However, since the cord angle is too small in this radial tire, a great deal of force is necessary for causing deformation of the tire during the process in which a green tire is bonded to a tire molding drum, molded and then vulcanized. Moreover, stress balance cannot be kept during vulcanization between the portion where the steel cord reinforcing layer is disposed and the upper end portion where the layer is not disposed so that production defects occur and tires having uniformity cannot be produced with a high level of productivity. Further, since the difference of rigidity is great between the tip portion of the steel cord reinforcing layer of the product tire and the carcass layer in the tire circumferential direction, separation is highly likely to develop at the tip of the reinforcing layer even after a relatively short period of use.

SUMMARY OF THE INVENTION

In a radial tire of the type wherein a steel cord reinforcing layer is disposed extending from a bead to a sidewall, the present invention contemplates to provide a radial tire which simultaneously improves both maneuvering stability and comfort of drive.

It is another object of the present invention to provide a radial tire which is free from the drop of durability resulting from the separation of the steel cord reinforcing layer and also free from the problem that uniformity is impeded by production defects in a tire production process, while satisfying the two requirements described above.

The objects of the invention described above can be accomplished by a radial tire characterized in that carcass layers of a two-ply structure consisting of inner and outer carcass layers is disposed; the inner carcass layer is turned up around each bead core from inside to outside in such a manner as to wrap therein a bead filler; a steel cord reinforcing layer is disposed outside the inner carcass layer; the outer carcass layer is disposed in such a manner that it covers the steel cord reinforcing layer and its end extends at least to near the bead core; a second filler is disposed outside the outer carcass layer; the second filler has a hardness which is below the hardness of the bead filler and within the range of 70 to 93 in terms of JIS hardness; the cord angle of the steel cord reinforcing layer is from 15° to 30° to a tire circumferential direction; and the height B of the steel cord reinforcing layer from a bead base to its upper end falls within the range specified by the following relationship, where; the height of the bead filler from the bead base is A, the height of the second filler from the bead base is C, and the sectional height of the tire is D:

$$0.2 D < B < 0.5 D \tag{2}$$

$$C > B > A \tag{2}$$

DESCRIPTION OF THE PREFERRED EMBODIMENTS

Figure 1:
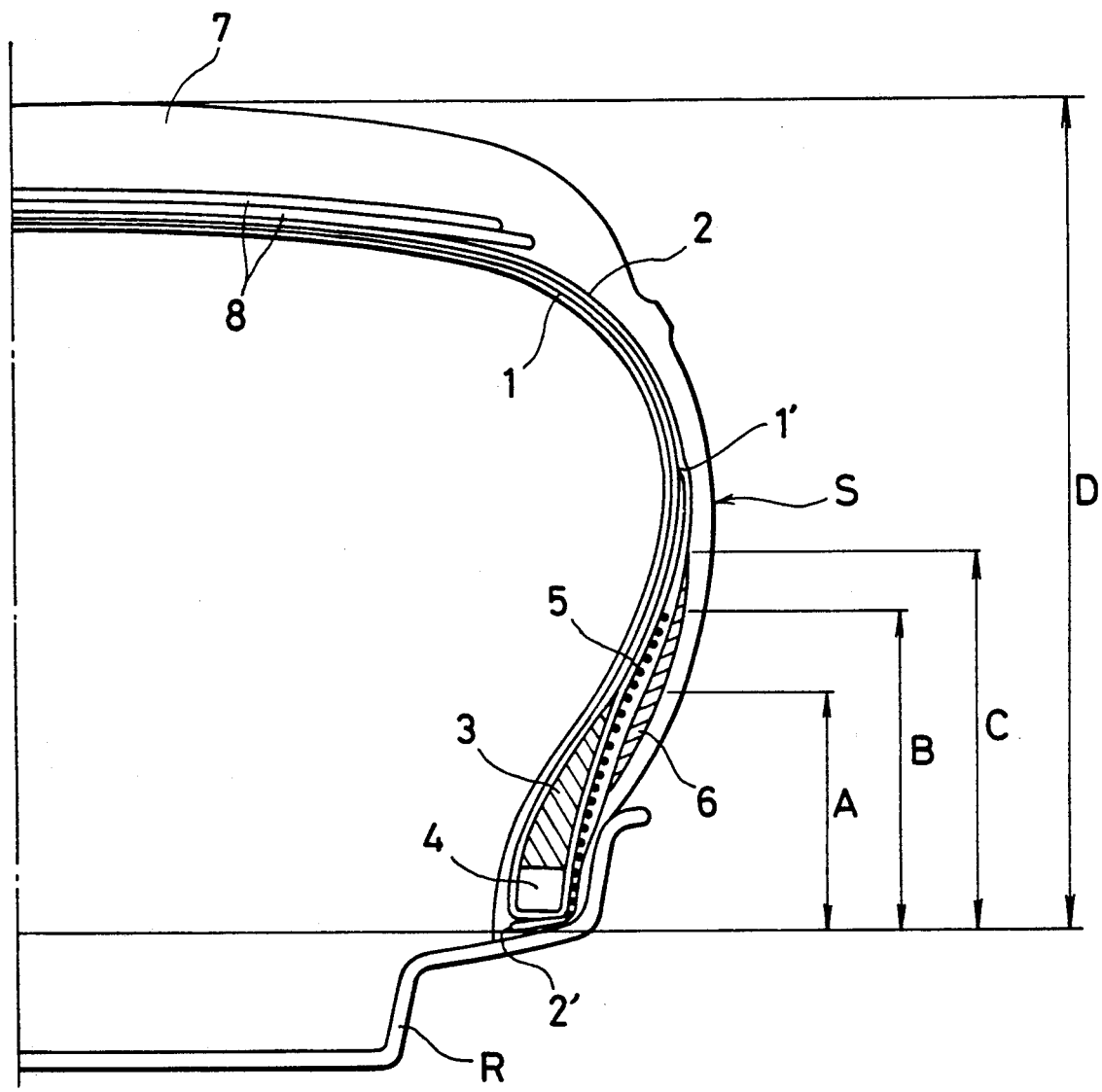
FIG. 1 is a semi-sectional view showing an example of the tire in accordance with the present invention.

In the tire of the present invention fitted to a rim R as shown in FIG. 1, two inner and outer carcass layers 1 and 2 whose cords are arranged substantially in a radial direction are disposed between a pair of right and left bead cores 4. A belt layer 8 extending in a tire circumferential direction is disposed outside these carcass layers 1 and 2 at a tread portion 7. The inner carcass layer 1 is turned up from inside to outside around the bead core 4 while wrapping a bead filler 3 into it and the end 1' of this turnup portion is positioned near the tire maximum width position of the tire on a sidewall S. On the other hand, the outer carcass layer 2 is disposed outside the bead filler 3 in such a manner as to cover the turnup portion of the inner carcass layer 1 and its end 2' reaches at least near the bead core 4.

A steel cord reinforcing layer 5 is disposed between the turnup portion of the inner carcass layer 1 and the outer carcass layer 2 and extends from the fitting zone of the tire with the rim flange of the rim R to near the tire maximum width portion of the sidewall S. A second filler 6 is disposed outside the reinforcing layer 5 with the outer carcass layer 2 in between throughout the zone from near the upper end of the rim flange of the rim R to the portion above the upper end of the steel cord reinforcing layer 5.

In the tire of the present invention having such a bead structure, the cord angle of the steel cord reinforcing layer 5 is within the range of 15° to 30° to the tire circumferential direction and the height B of the upper end of this steel cord reinforcing layer 5 from the bead base is defined by:

$$0.2 D < B < 0.5 D \quad (1)$$

In other words, the height B must be more than 20% of the tire sectional height D but less than 50% of D.

If the cord angle of the steel cord reinforcing layer 5 is smaller than 15°, moldability drops in the tire molding process and defects of products will occur. Accordingly, tires having uniformity cannot be produced with high productivity. Further, separation from rubber is likely to occur at the end portion of the steel cord reinforcing layer in the course of use of the tire for a long period and durability drops. If the cord angle exceeds 30°, on the other hand, rigidity of the side portion in the tire circumferential direction drops. In consequence, sufficient improvement in maneuvering stability cannot be expected and comfort of drive drops because rigidity of the side portion in the longitudinal direction increases.

If the height B of the upper end of this steel cord reinforcing layer 5 from the bead base is below 20% of the tire sectional height D, the reinforcing effect becomes insufficient and maneuvering stability of the tire cannot be improved. On the other hand, if the height B is beyond 50% of the tire sectional height D, rigidity of the side portion in the longitudinal direction becomes so great that comfort of drive drops and moreover, since separation of the steel cord reinforcing layer becomes more likely to occur, durability of the tire drops.

The second filler 6 described above must have hardness which is below the hardness of the bead filler 3 and its JIS hardness must be within the range of 70 to 93. If this hardness is higher than that of the bead filler 3, rigidity of the side portion in the longitudinal direction becomes high and comfort of drive drops. If its JIS hardness is outside the range described above, balance of rigidity between the filler and the steel cord reinforcing layer is lost so that sufficient improvement in maneuvering stability and comfort of drive cannot be obtained and the bead filler 3 is likely to be broken.

In the tire of the present invention, the bead filler, the steel cord reinforcing layer and the second filler must satisfy the following position relationship when the heights at the upper ends of them from the bead base are represented by A, B and C, respectively:

$$C > B > A \quad (2)$$

In other words, in the present invention, the height B of the steel cord reinforcing layer 5 at its upper end must be greater than the height A of the bead filler 4 at its upper end but smaller than the height C of the second filler layer 6 at its upper end. If the height B of the steel cord reinforcing layer 5 at its upper end does not satisfy the relation expressed by the formula (2), rigidity of the side portion in both the transverse and longitudinal directions of the tire increases and comfort of drive cannot be improved to a high level. Further, the steel cord reinforcing layer 5 is likely to cause separation and durability of the tire drops.

In the radial tire having the carcass layer of the two-ply structure equipped with the steel cord reinforcing layer extending from the bead to the sidewall, the present invention specifies the upper end positions of the steel cord reinforcing layer, carcass layer and second filler as well as the cord angle of the steel cord reinforcing layer and the hardness of the second filler so that rigidity of the side portion in the transverse and longitudinal directions of the tire can be kept at a low level and rigidity of the side portion in the tire circumferential direction can be increased selectively. Accordingly, the present invention can improve comfort of drive while keeping maneuvering stability at a high level but does not invite the drop of productivity of the radial tires of this kind and their durability.

EMBODIMENTS

Eight kinds of tires, i.e. Comparative Tires I–VII and the tire of the present invention, having the bead structures shown in FIGS. 2–7, were produced and rigidity of the side portion, maneuvering stability, comfort of drive and durability were evaluated for these tires with the results tabulated in the later-appearing table.

Comparative Tire I

Figure 2:
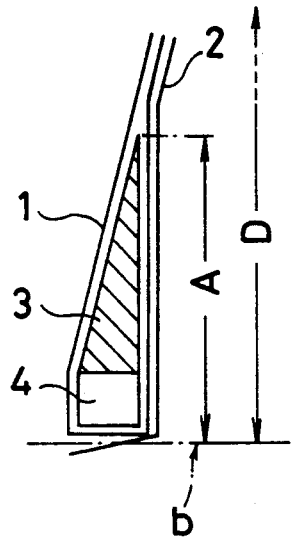
FIGS. 2 to 7 are schematic sectional views, each showing a bead portion having a different structure.

A tire having the structure wherein only the inner carcass layer 1 turned up around the bead core while wrapping the bead filler 3 shown in FIG. 2 and the outer carcass layer 2 laminated at the turnup portion of the inner carcass layer 1 were disposed but the steel cord reinforcing layer 5 and the second filler 6 were not disposed.

Comparative Tire II

Figure 3:
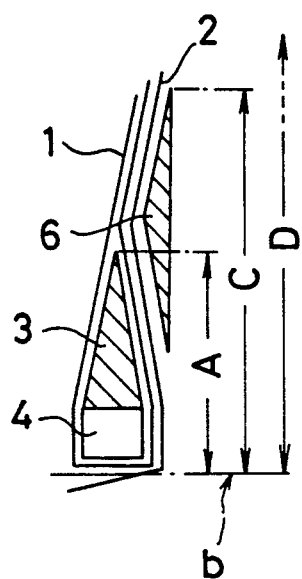

A tire having the structure as shown in FIG. 3 wherein the second filler 6 was disposed outside the outer carcass layer 2 of the Comparative Tire I.

Comparative Tire III

Figure 4:
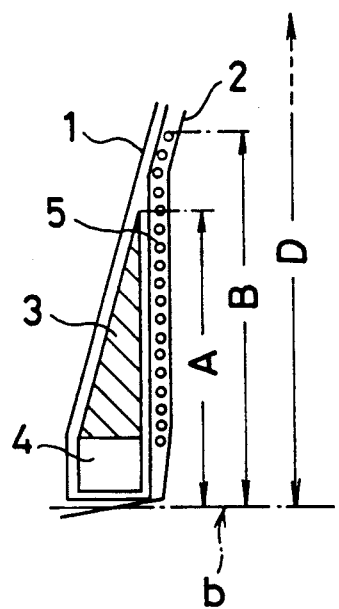

A tire having the structure as shown in FIG. 4 wherein the steel cord reinforcing layer 5 was disposed between the turnup portion of the inner carcass layer 1 and the outer carcass 2 of the Comparative Tire I.

Comparative Tire IV

Figure 5:
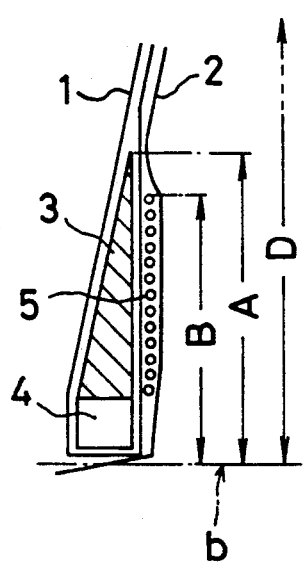

A tire having the structure as shown in FIG. 5 wherein, in the Comparative Tire III, the height B of the steel cord reinforcing layer 5 from the bead base and the cord angle were changed as shown in Table.

The Tire of the Present Invention

Figure 6:
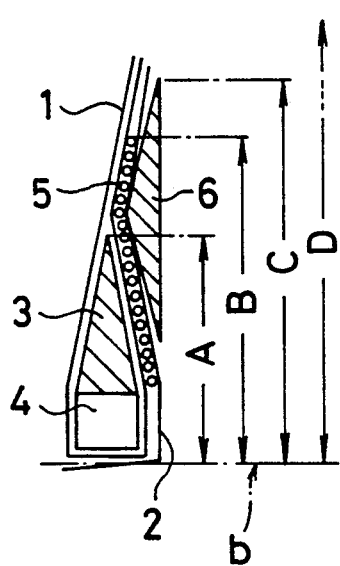

A tire having the structure shown in FIG. 6, wherein the steel cord reinforcing layer 5 in the same way as the Comparative Tire III and satisfying the requirements of the present invention tabulated in Table.

Comparative Tire V

In the tire of the present invention shown in FIG. 6, a tire having the structure wherein the hardness of the second filler 6 of the steel cord reinforcing layer 5 was changed as tabulated in Table.

Comparative Tire VI

In the tire of the present invention shown in FIG. 6, a tire having the structure wherein the cord angle of the steel cord reinforcing layer 5 was changed as tabulated in Table.

Comparative Tire VII

Figure 7:
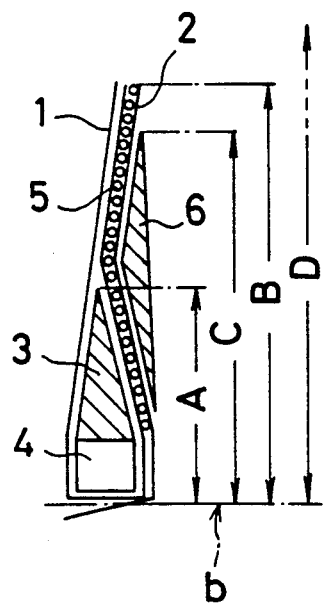
Figure 8:
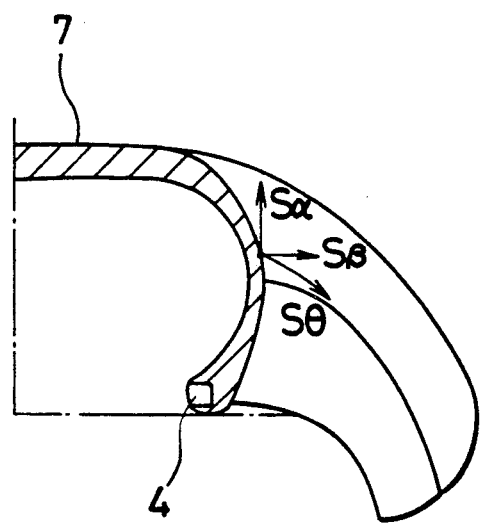
FIG. 8 is a perspective view useful for explaining the positions of measurement of rigidity in longitudinal, transverse and circumferential directions of the tire.

A tire having the structure as shown in FIG. 7 wherein the disposition zone of the steel cord reinforcing layer 5 in the tire of the present invention shown in FIG. 6 was changed as tabulated in Table.

All of these tires had a size of 205/60R15, a rim of 6JJ and an air pressure of 2.0 kgf/cm$^2$.

Maneuvering stability, comfort of drive, durability and rigidity of the side portion were evaluated by the following evaluation methods, respectively.

Maneuvering stability (maneuverability, stability)

Lane change test, steady turning test, brake/drive test and excessive response test were conducted by five panelers in a test course in each speed range to make feeling evaluation.

Maneuverability represents motion performance of the car such as working resistance and response characteristics of steering, and the like.

Stability represents stability of the car to the motion due to steering and against disturbance.

The evaluation was made by a ten-point method and represented by index. The greater the index value, the more excellent maneuvering stability.

Comfort of drive (input strength, damping characteristics)

Feeling evaluation was made by conducting functional tests on various rough roads disposed in the test course.

The term "input strength" means the magnitude of the input from the road surface which the panelers felt.

The term "damping characteristics" means the damping characteristics of the input from the road surface.

The result was evaluated by the ten-point method and represented by index. The greater the index value, the more excellent maneuvering stability.

Durability

Each tire was run (running distance of 4,050 km) for 50 hours under the following condition by use of an indoor drum tester, and the breakage condition was examined and evaluated.

| | |
|---|---|
| Internal pressure P: | JATMA max. air pressure 2.5 kg/cm$^2$ |
| Load W: | JATMA incremented by 13% every four hours starting with a designed normal load. |
| Speed V: | 81 kg/hr |
| Drum diameter: | 1,707 mm |
| Rim: | 15 × 6 JJ. |

Rigidity of side portion Rigidity of the side portion S$\alpha$ in the longitudinal direction, rigidity of the side portion S$\beta$ in the transverse direction and rigidity of the side portion S$\theta$ in the circumferential direction were measured at the measurement positions of the tire shown in FIG. 9 and the result was represented by index with the measurement value of the Comparative Tire I as a reference (100). The greater the index value, the greater the rigidity of the side portion.

| | | Comparative Tire | | | | Tire of this Invention | Comparative Tire | | |
|---|---|---|---|---|---|---|---|---|---|
| | | I | II | III | IV | | V | VI | VII |
| bead structure | | FIG. 2 | FIG. 3 | FIG. 4 | FIG. 5 | FIG. 6 | FIG. 6 | FIG. 6 | FIG. 7 |
| A (mm) | | 45 | 30 | 45 | 45 | 30 | 30 | 30 | 30 |
| B (mm) | | — | — | 65 | 40 | 50 | 50 | 50 | 65 |
| C (mm) | | — | 60 | — | — | 60 | 60 | 60 | 60 |
| D (mm) | | 123.4 | 123.4 | 123.4 | 123.4 | 123.4 | 123.4 | 123.4 | 123.4 |
| B/D | | — | — | 0.53 | 0.32 | 0.41 | 0.41 | 0.41 | 0.53 |
| cord angle (°) | | — | — | 20 | 10 | 20 | 20 | 35 | 20 |
| JIS hardness | bead filler | 85 | 85 | 85 | 85 | 85 | 85 | 85 | 85 |
| | second filler | — | 80 | — | — | 80 | 95 | 80 | 80 |
| side rigidity (index) | longitudinal direction | 100 | 84 | 125 | 115 | 103 | 110 | 112 | 111 |
| | transverse direction | 100 | 82 | 128 | 118 | 104 | 117 | 106 | 110 |
| | circumferential direction | 100 | 105 | 135 | 122 | 132 | 142 | 120 | 140 |
| maneuvering stability | maneuverability | 7 | 6 | 8 | 8 | 8 | 8 | 7 | 8 |
| | stability | 7 | 7 | 6 | 7 | 9 | 7 | 7 | 7 |
| comfort of drive | impact strength | 7 | 8 | 5 | 6 | 7 | 6 | 6 | 6 |
| | damping characteristics | 7 | 8 | 7 | 7 | 8 | 8 | 7 | 8 |
| indoor drum durability | running hour (hr) | 50 | 50 | 30 | 30 | 50 | about 27 | 50 | 34 |
| | running distance (Km) | 4050 | 4050 | 2430 | 2430 | 4050 | 2154 | 4050 | 2756 |
| | breakage state | not broken | not broken | upper end of steel cord reinforcing layer separated | not broken | not broken | filler layer broken | not broken | same as Comp. Tire III |

As can be seen from the table, rigidity of the side portion in the tire circumferential direction of the Comparative Tire II is equal to that of the Comparative Tire I and maneuvering stability and comfort of drive are at substantially the same level as those of the Comparative Tire I. However, since the drop of rigidity of the side portion S$\beta$ in the transverse direction was great, maneuverability dropped.

In Comparative Tires III and IV, rigidity of the side portion in all the longitudinal, transverse and circumferential directions increased and maneuvering stability, particularly maneuverability, was improved. However, since rigidity of the side portion in the longitudinal direction became too great, comfort of drive dropped in both tires. Separation occurred at the upper end of the steel cord reinforcing layer in both tires and their durability got deteriorated.

In contrast with these Comparative Tires I–IV, rigidity of the side portions in the longitudinal and transverse direction was kept at a low level in the tire of the present invention and because rigidity of the side portion in the circumferential direction was increased selectively, maneuvering stability was improved remarkably while comfort of drive was kept at a high level equal to that of the Comparative Tires I and II. Moreover, since the cord angle of the steel cord reinforcing layer was not so small as that of the Comparative Tire IV, tire moldability was excellent and producibility did not drop.

However, if the hardness of the second filler became greater than that of the bead filler in the present invention in the same way as in the Comparative Tire V, rigidity in the circumferential, longitudinal and transverse directions increased so that comfort of drive dropped, though maneuvering stability was improved. Moreover, the bead filler was broken and durability of the tire was deteriorated.

When the cord angle of the steel cord reinforcing layer was greater than 30° as in the Comparative Tire VI, rigidity of the side portion in the longitudinal direction became so great that comfort of drive was deteriorated but since rigidity of the side portion in the circumferential direction did not much increase, maneuvering stability was not improved.

Furthermore, when the height B of the upper end of the steel cord reinforcing layer from the bead base was 0.53 times (over 0.5 times) the tire sectional height D, rigidity of the side portion in the longitudinal, transverse and circumferential directions all increased in the same way as in the Comparative Tire V and comfort of drive deteriorated. Additionally, separation of the steel cord reinforcing layer occurred.

What is claimed is:

1. Pneumatic radial tire characterized in that carcass layers of two-ply structure consisting of an inner carcass layer and an outer carcass layer is disposed;
    said inner carcass layer is turned up from inside to outside around each bead core in such a manner as to wrap a bead filler therein;
    a steel cord reinforcing layer is disposed outside said turnup portion of the inner carcass layer;
    said outer carcass layer is disposed in such a manner that it covers the outside of said steel cord reinforcing layer and its tip extends to at least near said bead core;
    a second filler is disposed outside said outer carcass layer;
    said second filler has a hardness below that of said bead filler and within the range of 70 to 93 in terms of JIS hardness;
    the cord angle of said steel cord reinforcing layer is from 15° to 30° to a tire circumferential direction; and
    the height B of the steel cord reinforcing layer from a bead base to its upper end is specified by the following relationship, where; the height of said bead filler from said bead base to its upper is A, the height of said second filler from said bead base to its upper end C and a sectional height of said tire D:

$$0.2 D < B < 0.5 D \quad (1)$$

$$C > B > A \quad (2)$$

2. A pneumatic radial tire according to claim 1, wherein the end of said turnup portion of said inner carcass layer is positioned near a tire maximum width position of a sidewall.

3. A pneumatic radial tire according to claim 1, wherein said steel cord reinforcing layer is disposed in a region extending from near a fitting zone of the tire with a rim flange to a tire maximum width of a sidewall.

4. A pneumatic radial tire according to claim 1, wherein said second filler is disposed in a region extending from near the upper end of a rim flange to a portion above the upper end of said steel cord reinforcing layer.

* * * * *